United States Patent
Watanabe et al.

(10) Patent No.: US 12,020,491 B2
(45) Date of Patent: Jun. 25, 2024

(54) LANE LINK GENERATION DEVICE AND COMPUTER READABLE MEDIUM

(71) Applicant: Mitsubishi Electric Corporation, Tokyo (JP)

(72) Inventors: Masashi Watanabe, Tokyo (JP); Yukako Takahashi, Tokyo (JP); Takuma Kadoya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 571 days.

(21) Appl. No.: 17/276,496

(22) PCT Filed: Oct. 10, 2019

(86) PCT No.: PCT/JP2019/040088
§ 371 (c)(1),
(2) Date: Mar. 16, 2021

(87) PCT Pub. No.: WO2020/080257
PCT Pub. Date: Apr. 23, 2020

(65) Prior Publication Data
US 2021/0303873 A1    Sep. 30, 2021

(30) Foreign Application Priority Data
Oct. 15, 2018   (JP) ................................. 2018-194019

(51) Int. Cl.
*G06V 20/56* (2022.01)
*G06T 7/13* (2017.01)
(Continued)

(52) U.S. Cl.
CPC .............. *G06V 20/588* (2022.01); *G06T 7/13* (2017.01); *G06T 7/181* (2017.01); *G06T 7/70* (2017.01);
(Continued)

(58) Field of Classification Search
CPC .. G06V 20/588; G06V 2201/07; G06T 7/181; G06T 7/13; G06T 7/70; G06T 2207/30256
See application file for complete search history.

(56) References Cited

U.S. PATENT DOCUMENTS

| 10,533,863 | B2 * | 1/2020 | Ma ...................... G01C 21/3819 |
| 2007/0288158 | A1 * | 12/2007 | Dorum .................... G01C 21/36 |
| | | | 701/410 |

(Continued)

FOREIGN PATENT DOCUMENTS

| CN | 108088448 A | 5/2018 |
| JP | 2006-266865 A | 10/2006 |

(Continued)

OTHER PUBLICATIONS

Extended European search report issued on Mar. 10, 2022, in corresponding European patent Application No. 19874235.5, 15 pages.

(Continued)

*Primary Examiner* — Shefali D Goradia
(74) *Attorney, Agent, or Firm* — XSENSUS LLP

(57) ABSTRACT

A lane link generation device includes an acquisition unit, a lane link generation unit, and a connection unit. The connection unit acquires first and second sections representing vehicle traveling areas. The lane link generation unit generates lane links in the first section and the second section. When the lane link of the first section and the lane link of the second section have endpoints, the connection unit determines a connection destination endpoint which is an endpoint of a connection destination to be connected to an endpoint and which is an endpoint belonging to a different section, based on determination rule information. The con- (Continued)

nection unit generates a lane link that connects the endpoint to the determined connection destination endpoint.

5 Claims, 12 Drawing Sheets

(51) Int. Cl.
    *G06T 7/181* (2017.01)
    *G06T 7/70* (2017.01)
(52) U.S. Cl.
    CPC ............... *G06T 2207/30256* (2013.01); *G06V 2201/07* (2022.01)

(56) References Cited

U.S. PATENT DOCUMENTS

| | | | |
|---|---|---|---|
| 2012/0128207 A1 | 5/2012 | Manabe et al. | |
| 2013/0158871 A1* | 6/2013 | Joh | G01C 21/28 703/2 |
| 2014/0244153 A1* | 8/2014 | Dorum | G01C 21/3632 701/409 |
| 2016/0153788 A1* | 6/2016 | Weiland | G06F 16/29 701/532 |
| 2017/0243485 A1* | 8/2017 | Rubin | H04W 4/46 |
| 2018/0148052 A1* | 5/2018 | Suto | B60W 40/06 |
| 2018/0197414 A1* | 7/2018 | Oooka | G08G 1/161 |

FOREIGN PATENT DOCUMENTS

| | | |
|---|---|---|
| JP | 2012-37490 A | 2/2012 |
| JP | 2018-87763 A | 6/2018 |
| WO | 2019/239477 A1 | 12/2019 |
| WO | WO-2020157798 A1 * | 8/2020 |

OTHER PUBLICATIONS

International Search Report and Written Opinion mailed on Dec. 24, 2019, received for PCT Application PCT/JP2019/040088 Filed on Oct. 10, 2019, 8 pages including English Translation.

Partial supplementary European search report issued on Nov. 5, 2021, in corresponding European patent Application No. 19874235. 5, 13 pages.

Sven Bauer et al., "Using High-Definition Maps for Precise Urban Vehicle Localization", 2016 IEEE 19th International Conference on Intelligent Transportation Systems (ITSC), IEEE, Nov. 1-4, 2016, pp. 492-497, Rio de Janeiro, Brazil.

* cited by examiner

LANE LINK GENERATION DEVICE AND COMPUTER READABLE MEDIUM

CROSS-REFERENCE TO RELATED APPLICATIONS

The present application is based on PCT filing PCT/JP2019/040088, filed Oct. 10, 2019, which claims priority to JP 2018-194019, filed Oct. 15, 2018, the entire contents of each are incorporated herein by reference.

TECHNICAL FIELD

The present invention relates to a device that generates map information utilizing sensor data collected by measuring a road and its periphery.

BACKGROUND ART

In recent years, development of autonomous-driving cars has been promoted. In order to realize autonomous driving, high-precision map information is required, in addition to various sensors such as a camera and a laser radar which are attached to an autonomous-driving car itself. As the information to be included in this high-precision map, not only the position information of an actually existing feature such as a road marking line, a road shoulder edge, and a sign, but also the information (hereinafter referred to as lane link) indicating a lane to drive is required. Normally, a lane is defined by two road marking lines. A lane link is information representing an intermediate line between the two road marking lines.

CITATION LIST

Patent Literature

Patent Literature 1: JP 2012-37490 A

SUMMARY OF INVENTION

Technical Problem

A map generation system of Patent Literature 1 provides a function of sectioning a space into a mesh, creating various candidate lines in the mesh, and performing assessment, thereby detecting a step from point cloud information. In lane link automatic generation that takes road marking line information as input, for a normal section, a lane link can be automatically generated by generating an intermediate line of road marking lines and an intermediate line of road shoulder edges.

However, regarding a portion where a lane branches or lanes merge, it is necessary to generate a lane link at a portion different from the intermediate line of the road marking lines. Therefore, it is not easy to generate a lane link automatically.

It is an objective of the present invention to provide a device that generates a lane link automatically from road marking line information.

Solution to Problem

A lane link generation device according to the present invention includes:
an acquisition unit to acquire information of a first section representing a vehicle traveling area and information of a second section representing a vehicle traveling area;
a lane link generation unit to generate a lane link of the first section, which represents a reference line of the traveling area, based on two boundary lines of the traveling area represented by the first section, and to generate a lane link of the second section, which represents a reference line of the traveling area, based on two boundary lines of the traveling area represented by the second section; and
a connection unit to connect the lane link of the first section with the lane link of the second section, when at least one of the two boundary lines of the traveling area represented by the first section is common to the two boundary lines of the traveling area represented by the second section.

Advantageous Effects of Invention

With a lane link generation device of the present invention, a lane link can be generated appropriately even at a portion where a road marking line ends off, a portion where a branch exists, and a portion where a merge exists.

DESCRIPTION OF EMBODIMENTS

Embodiment 1

A lane link generation device 100 of Embodiment 1 will be described with referring to FIGS. 1 to 11. The lane link generation device 100 is a device that acquires a section representing a vehicle traveling area and generates a lane link representing a reference line of the traveling area.

Figure 1:
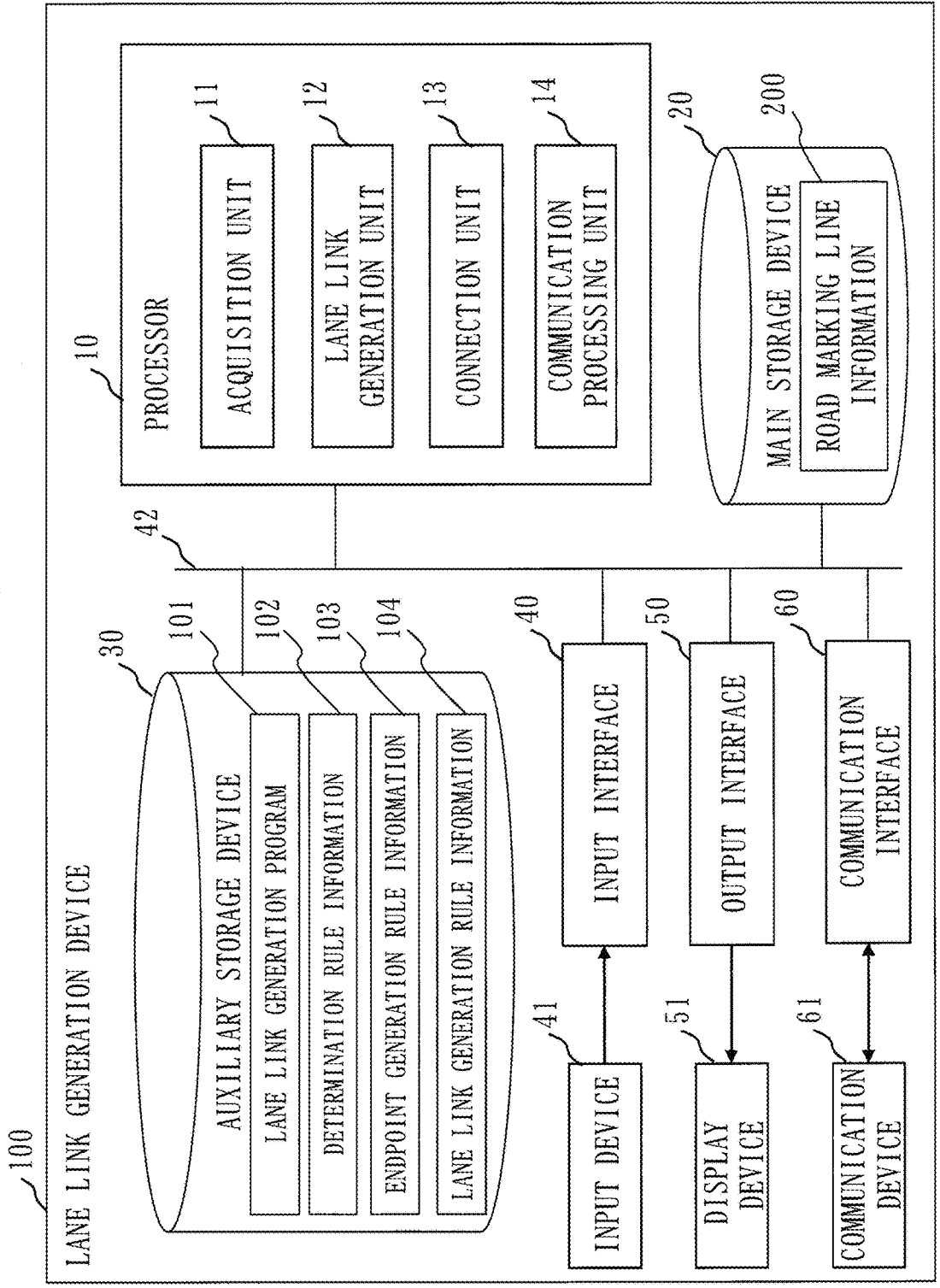
FIG. 1 is a diagram of Embodiment 1 which illustrates a hardware configuration of a lane link generation device 100.

FIG. 1 illustrates a hardware configuration of the lane link generation device 100.

DESCRIPTION OF CONFIGURATIONS

The lane link generation device 100 of FIG. 1 is a computer. The lane link generation device 100 is provided with a processor 10 and is also provided with other hardware devices such as a main storage device 20, an auxiliary storage device 30, an input interface 40, an output interface 50, and a communication interface 60. The processor 10 is connected to the other hardware devices via a signal line 42 and controls the other hardware devices. The lane link generation device 100 is provided with an input device 41, a display device 51, and a communication device 61. The input device 41 is connected to the input interface 40. The input device 41 is a device such as a keyboard and a mouse. The display device 51 is connected to the output interface 50. An example of the display device 51 is a liquid crystal display. The communication device 61 is connected to the communication interface 60. An example of the communication device 61 is a communication board.

The processor 10, the main storage device 20, and the auxiliary storage device 30 may be provided to the same server, the same virtual server, or the same cloud server. The signal line 42 may be virtually connected by operations of software by some address area designation.

The lane link generation device 100 is provided with an acquisition unit 11, a lane link generation unit 12, a connection unit 13, and a communication processing unit 14, as function elements. The acquisition unit 11, the lane link generation unit 12, the connection unit 13, and the communication processing unit 14 are implemented by a lane link generation program 101. The lane link generation program 101 is stored in the auxiliary storage device 30.

The processor 10 is a device that executes the lane link generation program 101. The lane link generation program 101 is a program that implements functions of the acquisition unit 11, lane link generation unit 12, connection unit 13, and communication processing unit 14. The processor 10 is an Integrated Circuit (IC) which performs computation processing. Specific examples of the processor 10 include a Central Processing Unit (CPU), a Digital Signal Processor (DSP), and a Graphics Processing Unit (GPU).

The main storage device 20 is a storage device that stores data temporarily. Specific examples of the main storage device 20 include a Static Random Access Memory (SRAM) and a Dynamic Random Access Memory (DRAM). The main storage device 20 holds a computation result of the processor 10.

The auxiliary storage device 30 is a storage device that stores data in a non-volatile manner. Specific examples of the auxiliary storage device 30 include a Hard Disk Drive (HDD). The auxiliary storage device 30 may be a portable recording medium such as a Secure Digital (SD: registered trademark) memory card, a CompactFlash (CF), a NAND flash, a flexible disk, an optical disk, a compact disk, a blu-ray (registered trademark) disk, and a Digital Versatile Disk (DVD).

The input interface 40 is a port to which the input device 41 is connected and to which data of the input device 41 is inputted. The output interface 50 is a port to which an apparatus such as the display device 51 is connected so that data is outputted to the apparatus by the processor 10. The communication interface 60 is a communication port to which the communication device 61 is connected. Using the communication device 61, the communication processing unit 14 communicates with the other devices.

The lane link generation program 101 stored in the auxiliary storage device 30 is loaded to the main storage device 20 and executed by the processor 10.

The lane link generation device 100 may be provided with a plurality of processors that substitute for the processor 10. For example, the lane link generation device 100 may be provided with an image processing processor separately. The plurality of processors share execution of the lane link generation program 101. Each processor is a device that executes the lane link generation program 101, just as the processor 10 does.

Data, information, signal values, and variables values which are utilized, processed, or outputted by the lane link generation program 101 are stored in the main storage device 20, the auxiliary storage device 30, or a register or cache memory in the processor 10.

The lane link generation program 101 is a program that causes the computer to execute processes, procedures, or stages corresponding to the acquisition unit 11, the lane link generation unit 12, the connection unit 13, and the communication processing unit 14 each with its "unit" being replaced by "process", "procedure", or "stage".

A lane link generation method is a method that is carried out as the lane link generation device 100, being the computer, executes the lane link generation program 101.

The lane link generation program 101 may be stored in a computer readable recording medium and may be provided in the form of the recording medium, or may be provided as a program product.

DESCRIPTION OF OPERATIONS

Operations of the lane link generation device 100 will be described with referring to FIGS. 2 to 11. The operations of the lane link generation device 100 correspond to the lane link generation method. The operations of the lane link generation device 100 correspond to processing of the lane link generation program.

Figure 2:
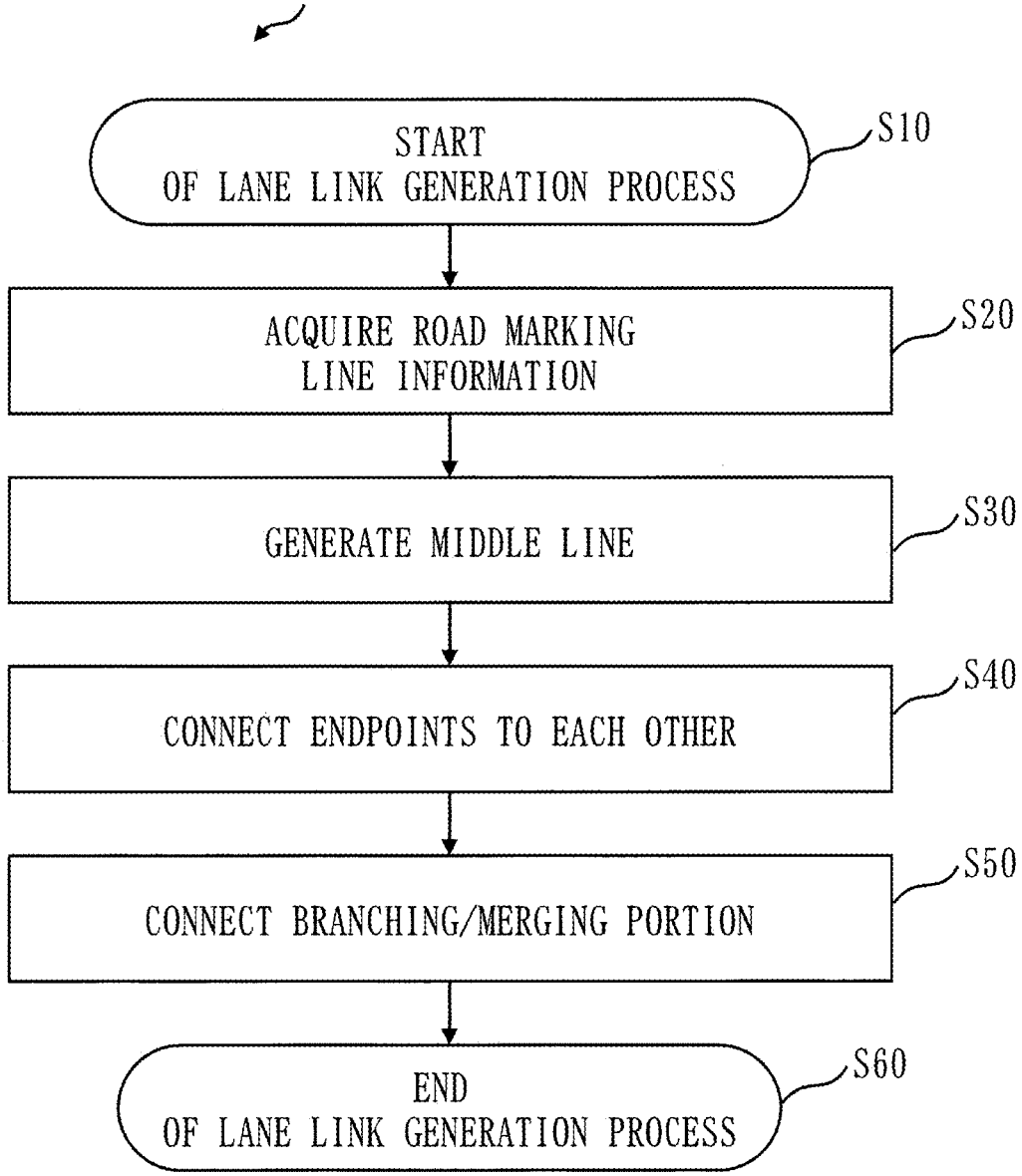
FIG. 2 is a diagram of Embodiment 1 which is a flowchart illustrating operations of the lane link generation device 100.

FIG. 2 is a flowchart illustrating the operations of the lane link generation device 100. The operations of the lane link generation device 100 will be described with referring to FIG. 2.

<Step S10>

In step S10, lane link generation processing operations are started.

<Step S20>

The acquisition unit 11 acquires information of a first section representing a vehicle traveling area, and information of a second section representing a vehicle traveling area. Specifically, the acquisition unit 11 acquires the information of the first section sandwiched by a pair of road marking lines to represent the vehicle traveling area, and information of the second section sandwiched by a pair of road marking lines to represent the vehicle traveling area and having a road marking line shared with the first section.

Figure 3:
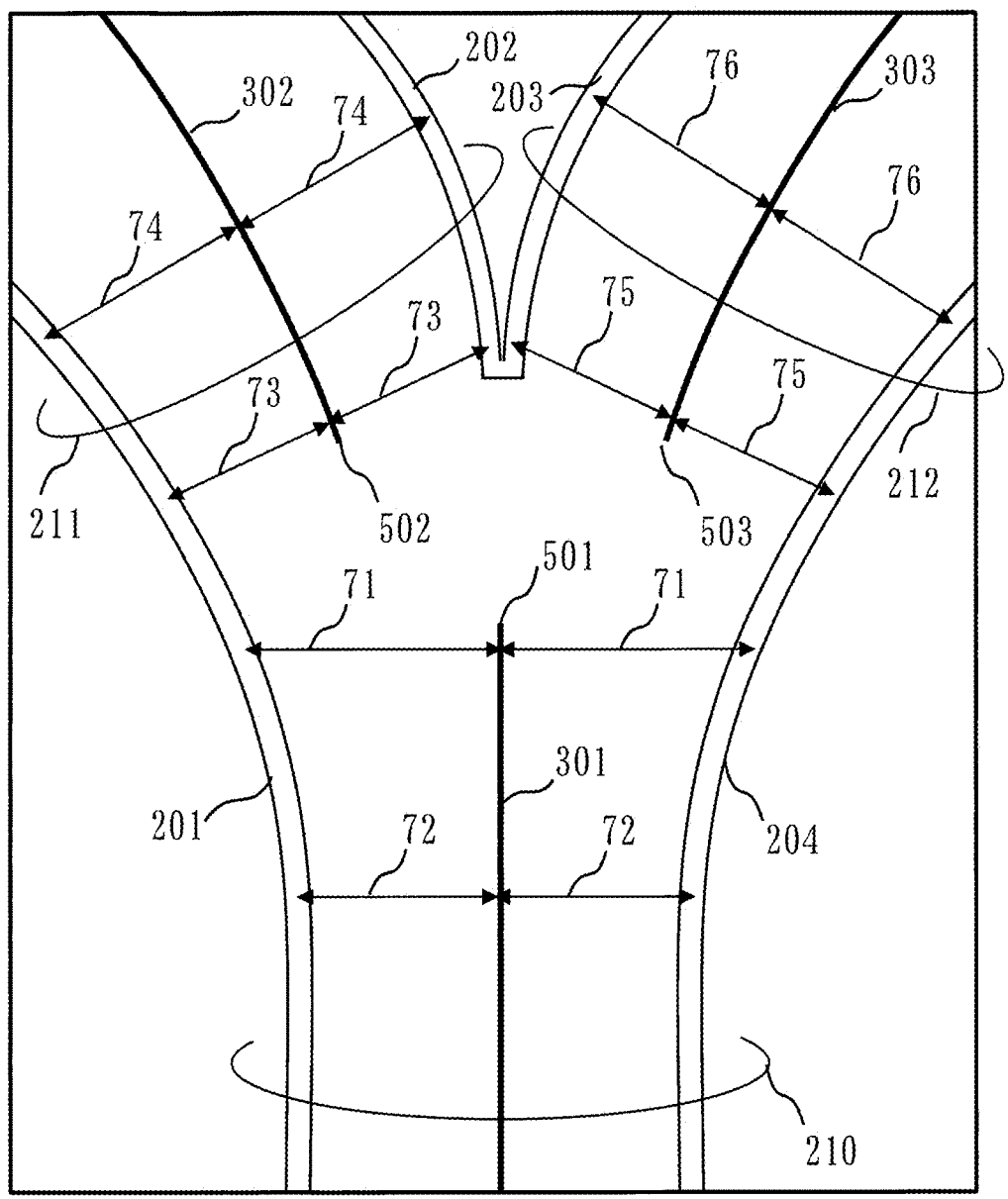
FIG. 3 is a diagram of Embodiment 1 which illustrates a state where one lane 210 branches into two lanes: a lane 211 and a lane 212.

In FIG. 3 to be described later, the first section is a lane 210 sandwiched by a road marking line 201 and a road marking line 204 which form a pair, to represent a vehicle traveling area. The second section is a lane 211 sandwiched by the road marking line 201 and a road marking line 202 which form a pair, to represent a vehicle traveling area.

Alternatively, the first section is a lane 210 sandwiched by a road marking line 201 and a road marking line 204 which form a pair, to represent a vehicle traveling area. The second section is a lane 212 sandwiched by a road marking line 203 and the road marking line 204 which form a pair, to represent a vehicle traveling area.

Specifically, this is as follows.

In step S20, the acquisition unit 11 acquires road marking line information 200 from the auxiliary storage device 30. The road marking line information 200 includes a plurality of road marking lines. The road marking line information 200 is stored in the main storage device 20 or the auxiliary storage device 30. In FIG. 1, the road marking line information 200 is stored in the main storage device 20.

<Step S30>

In step S30, the lane link generation unit 12 generates a lane link of the first section, which represents a reference line of the traveling area, based on two boundary lines of the traveling area represented by the first section. The lane link generation unit 12 generates a lane link of the second section, which represents a reference line of the traveling area, based on two boundary lines of the traveling area represented by the second section. The lane link generation unit 12 generates the lane link representing the reference line of the traveling area in each of the first section and the second section, based on lane link generation rule information 104 in which a lane link generation rule is defined.

The lane link generation rule information 104 is stored in the auxiliary storage device 30. Specifically, the lane link generation unit 12 operates as follows. The lane link generation unit 12 generates the lane link in a middle line generation process.

FIG. 3 illustrates a state where the one lane 210 branches into two lanes: the lane 211 and the lane 212.

Figure 4:
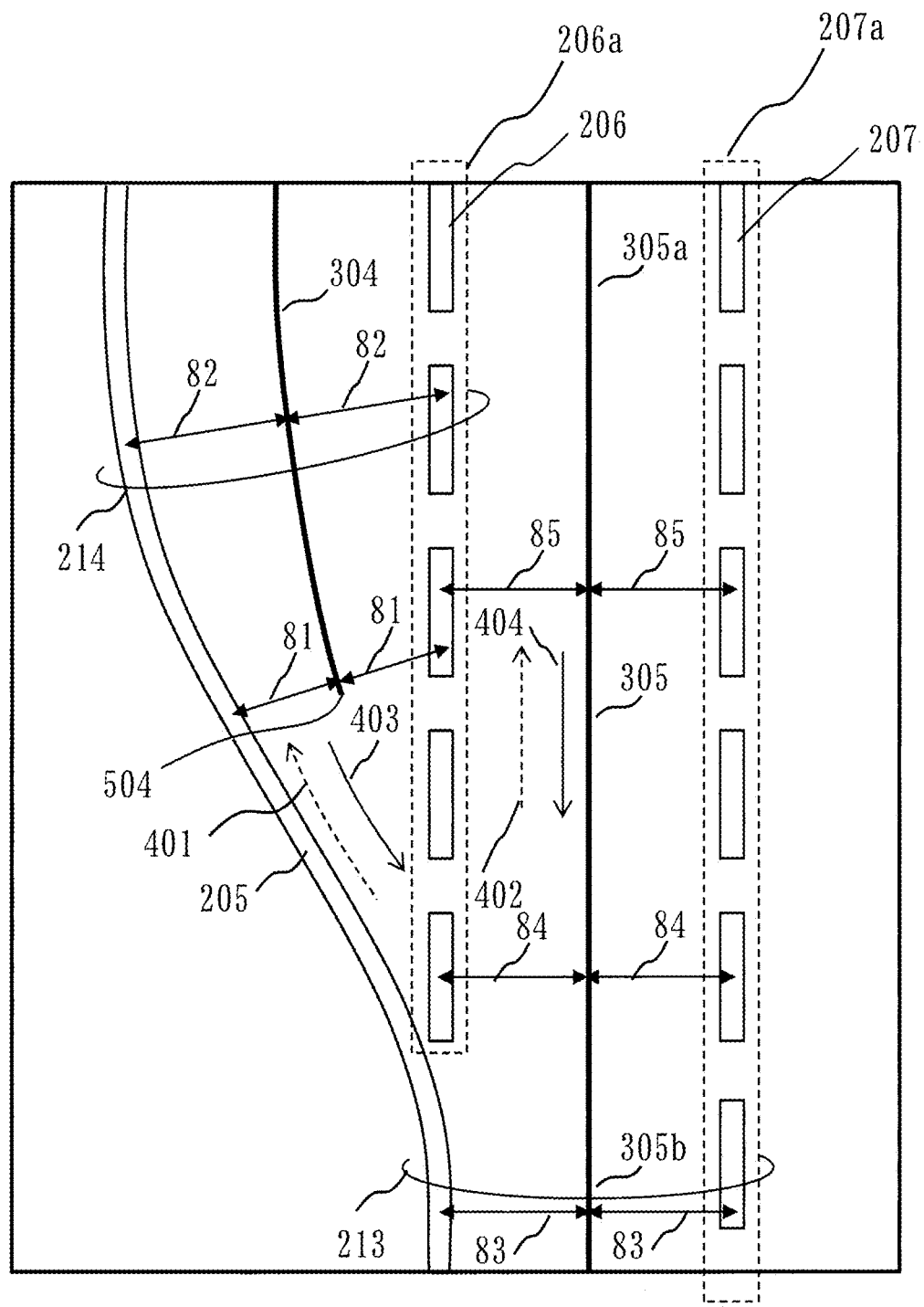
FIG. 4 is a diagram of Embodiment 1 which illustrates a lane 214 branching from one lane 213 or merging with one lane 213.

FIG. 4 illustrates a lane 214 branching from one lane 213.

Alternatively, FIG. 4 illustrates a lane 214 merging with one lane 213. In FIG. 4, when vehicle advancing directions are directions indicated by broken-line arrows 401 and 402, the lane 214 will be referred to as a lane branching from the lane 213. When vehicle advancing directions are directions indicated by solid-line arrows 403 and 404, the lane 214 will be referred to as a lane merging with the lane 213. Lane link generation by the lane link generation unit 12 will be described with referring to FIGS. 3 and 4.

The lane link generation unit 12 generates a lane link as a middle line between right and left adjacent road marking lines.

Specifically, the lane link generation unit 12 generates a lane link in a road area where spacing between right and left adjacent road marking lines falls within a particular value range. When spacing between road marking lines falls within a particular value range, it means that a road width which is the spacing between the right and left adjacent road marking lines falls within a range of, for example, 2 m or more to 6 m or less.

Note that on a road where no road marking line exists, the acquisition unit 11 acquires road shoulder edge information and generates a middle line of road shoulder edges indicated by the road shoulder edge information, thereby using the road shoulder edges in place of road marking lines. A road shoulder edge indicated by the road shoulder edge information can be regarded as a type of a section. The lane link generation device 100 treats the road shoulder edge as a road marking line.

Lane link generation in branching will be described with referring to FIG. 3. First, the lane link 301 will be described. The lane link 301 is generated between the road marking lines 201 and the road marking line 204 by the lane link generation unit 12. Two arrows 71 have the same length. The road marking line 201 and the road marking line 204 have widths. A left distal end of the left arrow 71 is located at the center of the width of the road marking line 201. A right distal end of the right arrow 71 is located at the center of the width of the road marking line 204. Two arrows 72 are similar to the two arrows 71, and accordingly a description on the two arrows 72 will be omitted. The lane link 301 has an endpoint 501. Note that spacing between the road marking line 201 and the road marking line 204 above the two arrows 71 exceeds 6 m. As the spacing between the road marking line 201 and the road marking line 204 does not satisfy the restriction "a range of 2 m or more to 6 m or less", the lane link 301 ends off to form the endpoint 501.

A lane link 302 will now be described. The lane link 302 is generated between the road marking line 201 and the road marking line 202 by the lane link generation unit 12. Two arrows 73 have the same length. The road marking line 201 and the road marking line 202 have widths. A left distal end of the left arrow 73 is located at the center of the width of the road marking line 201. A right distal end of the right arrow 73 is located at the center of the width of the road marking line 202. Two arrows 74 are similar to the two arrows 73, and accordingly a description on the two arrows 74 will be omitted. The lane link 302 has an endpoint 502. This is because the road marking line 202 ends off.

A lane link 303 is similar to the lane link 302, and accordingly a description on the lane link 303 will be omitted. The lane link 303 has an endpoint 503.

Generation of a branching or merging lane link will now be described with referring to FIG. 4. First, a lane link 304 will be described. The lane link 304 is generated between a road marking line 205 and a road marking line 206 by the lane link generation unit 12. The road marking line 206 is formed of a plurality of white lines surrounded by a broken line 206a. Similarly, a road marking line 207 to be described later is also formed of a plurality of white lines surrounded by a broken line 207a. Regarding the lane link 304, two arrows 81 have the same length.

The road marking line 205 and the road marking line 206 have widths. A left distal end of the left arrow 81 is located at the center of the width of the road marking line 205. A right distal end of the right arrow 81 is located at the center of the width of the road marking line 206. Two arrows 82 are similar to the two arrows 81, and accordingly a description on the two arrows 82 will be omitted. The lane link 304 has an endpoint 504. This is because spacing between the road marking line 205 and the road marking line 206 below the two arrows 81 is less than 2 m. As the spacing between the road marking line 205 and the road marking line 206 does not satisfy the restriction "a range of 2 m or more to 6 m or less", the lane link 304 ends off to form the endpoint 504.

A lane link 305 will now be described. In the lane link 305, a lane link 305a formed with using the road marking line 206 and the road marking line 207, and a lane link 305b formed with using the road marking line 205 and the road marking line 207 are integrated. Two arrows 83, two arrows 84, and two arrows 85 are similar to the two arrows 81 and the two arrows 82, and accordingly a description on the two arrows 83, two arrows 84, and two arrows 85 will be omitted.

In step S40, the connection unit 13 performs an endpoint connection process of connecting endpoints of the formed lane links to each other. In step S50, the connection unit 13 performs a process of connecting the lane links at a branching portion or merging portion. A branching portion and a merging portion only differ in terms of a vehicle advancing direction and are the same in terms of the endpoint connection process. Hence, branching and merging will be expressed together as branching/merging hereinafter. When step S50 is completed, the lane link generation process is completed.

Figure 5:
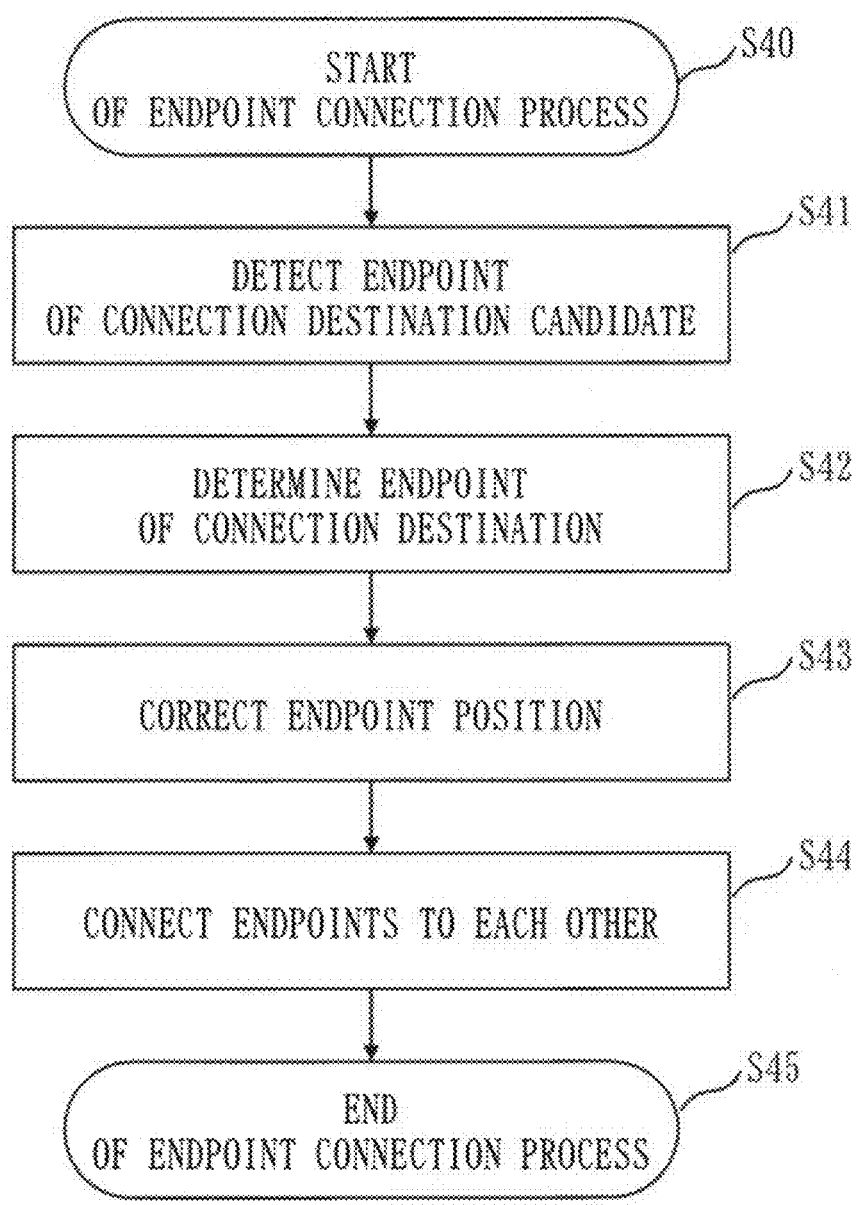
FIG. 5 is a diagram of Embodiment 1 which is a flowchart illustrating in detail step S40 being an endpoint connection process at a branching portion.

FIG. 5 is a flowchart of describing step S40 in detail, which is an endpoint connection process at a branching portion.

The endpoint connection process of step S40 will be described with referring to the flowchart of FIG. 5. The process of step S40 is performed by the connection unit 13.

When at least one of the two boundary lines of the traveling area represented by the first section is common to two boundary lines of the traveling area represented by the second section, the connection unit 13 connects the lane link of the first section with the lane link of the second section. Specifically, this is as follows.

The connection unit 13 checks whether the lane link of the first section and the lane link of the second section have endpoints. When the lane link of the first section and the lane link of the second section have endpoints, the connection unit 13 determines a connection destination endpoint of an endpoint based on determination rule information 102 defining a rule that determines a connection destination endpoint which is an endpoint of a connection destination to be connected to the endpoint and which is an endpoint belonging to a different section. Then, the connection unit 13 generates a lane link that connects the endpoint to the determined connection destination endpoint. The determination rule information 102 is stored in the auxiliary storage device 30. Conditions (A. 1) and (A. 2) and conditions (B. 1) to (B. 3) are included in the determination rule information 102. Specific operations of the connection unit 13 will be described below.

<Step S41>

In step S41, the connection unit 13 detects an endpoint as a connection destination candidate from the lane links generated in step S30.

Regarding an endpoint of a connection origin, each endpoint is a connection origin. Step S41 is a process of detecting a connection destination endpoint of each endpoint.

Specifically, the connection unit 13 uses the condition (A. 1) and condition (A. 2) below as a detection rule on an endpoint of a connection destination candidate.

(A. 1) According to a first detection rule, one of right and left road marking lines constituting a connection origin lane is shared with a connection destination lane. This will be described with referring to FIG. 3. Assume that the lane 210 is a connection origin lane, and that the lane 211 and the lane 212 are both connection destination lanes. The lane 210 is formed of the left road marking line 201 and the right road marking line 204. The lane 211 is formed of the left road marking line 201 and the right road marking line 202. The lane 212 is defined by the left road marking line 203 and the right road marking line 204. That is, the connection destination lane 211 shares the left road marking line 201 with the connection origin lane 210, and the connection destination lane 212 shares the right road marking line 204 with the connection origin lane 210. This is what the rule (A. 1) means. Concerning the rule (A. 1), as illustrated in FIG. 3, for the branching portion, the left lane 211 and the lane 212 branch from the road marking lines 201 and 204 that define the lane 210 at the center. Concerning the road marking lines 201 and 204 on two sides, they remain to exist continuously even after branching takes place. Therefore, the rule (A. 1) is provided.

The rule (A. 2) is provided as a second detection rule.

(A. 2) A distance between a connection origin endpoint and a connection destination endpoint is within a predetermined distance. A predetermined distance is, for example, 50 m, although it is not limited to 50 m. The rule (A. 2) is provided because of the following. Even when an endpoint located at a far distance is connected based on a reason that a road marking line is shared, an appropriate lane link can unlikely to be generated, so that a connection destination endpoint will likely to be erroneously detected.

The connection unit 13 treats an endpoint that satisfies the two conditions of (A. 1) and (A. 2), as a connection destination candidate. In FIG. 3, the connection unit 13 detects the endpoint 502 and the endpoint 503 as connection destination endpoint candidates for the connection origin endpoint 501.

<Step S42>

In a connection destination determination process of step S42, the process by the connection unit 13 differs depending on a number of connection destination endpoint candidates which are detected by the connection destination candidate detection process of step S41 for the individual endpoints being connection origins. Therefore, description will be made for three conditions (B. 1) to (B. 3) separately.

(B. 1) Case with No Connection Destination Endpoint Candidate

When no connection destination endpoint candidate exists, the connection unit 13 does not connect a connection origin endpoint.

(B. 2) Case with One Connection Destination Endpoint Candidate

The connection unit 13 connects a connection origin endpoint to a connection destination endpoint being the candidate.

(B. 3) Case with Two or More Connection Destination Endpoint Candidates

When two or more connection destination endpoint candidates exist, the connection unit 13 executes the following process.

The connection unit 13 extracts an endpoint at the shortest point-to-point distance to the connection origin endpoint, among connection destination candidate endpoints.

This will be described with referring to FIG. 3. When the extracted connection destination candidate endpoint shares either one road marking line out of right and left road marking lines that define a lane link having a connection origin endpoint, then in step S44 to be described later, the connection unit 13 generates a lane link that connects the connection origin endpoint to the connection destination candidate endpoint. In FIG. 3, since the road marking line 201 that defines the lane link 301 also defines the lane link 302, the road marking line 201 is shared.

Hence, in step S44 to be described later, the connection unit 13 generates a lane link that connects the endpoint 501 to the endpoint 502. Furthermore, the connection unit 13 extracts connection destination candidate endpoints that share the other road marking line, and generates, from the extracted endpoints, a lane link that connects the connection origin endpoint to an endpoint at the shortest point-to-point distance, in step S44 to be described later. As the road marking line 204 that defines the lane link 301 also defines the lane link 303, the road marking line 204 is shared. Hence, the connection unit 13 generates a lane link that connects the endpoint 501 to the endpoint 503, in step S44 to be described later.

The determination rule information including the detection rules (A. 1) and (A. 2) and the three conditions (B. 1) to (B. 3) is stored in the auxiliary storage device 30. The connection unit 13 reads the determination rule information from the auxiliary storage device 30 and refers to the determination rule information. Alternatively, this determination rule information is set in the lane link generation program 101 which implements the connection unit 13.

<Step S43>

In step S43, the connection unit 13 corrects a position of at least one of the endpoints which are to be connected each by generating the lane link, before connection using the lane link. The following description presents a scheme of correcting positions of all endpoints to be connected. However, the connection unit 13 may correct a position of at least one endpoint. This will be described below specifically. The connection unit 13 corrects an endpoint position of the connection origin endpoint and an endpoint position of the connection destination endpoint.

Figure 6:
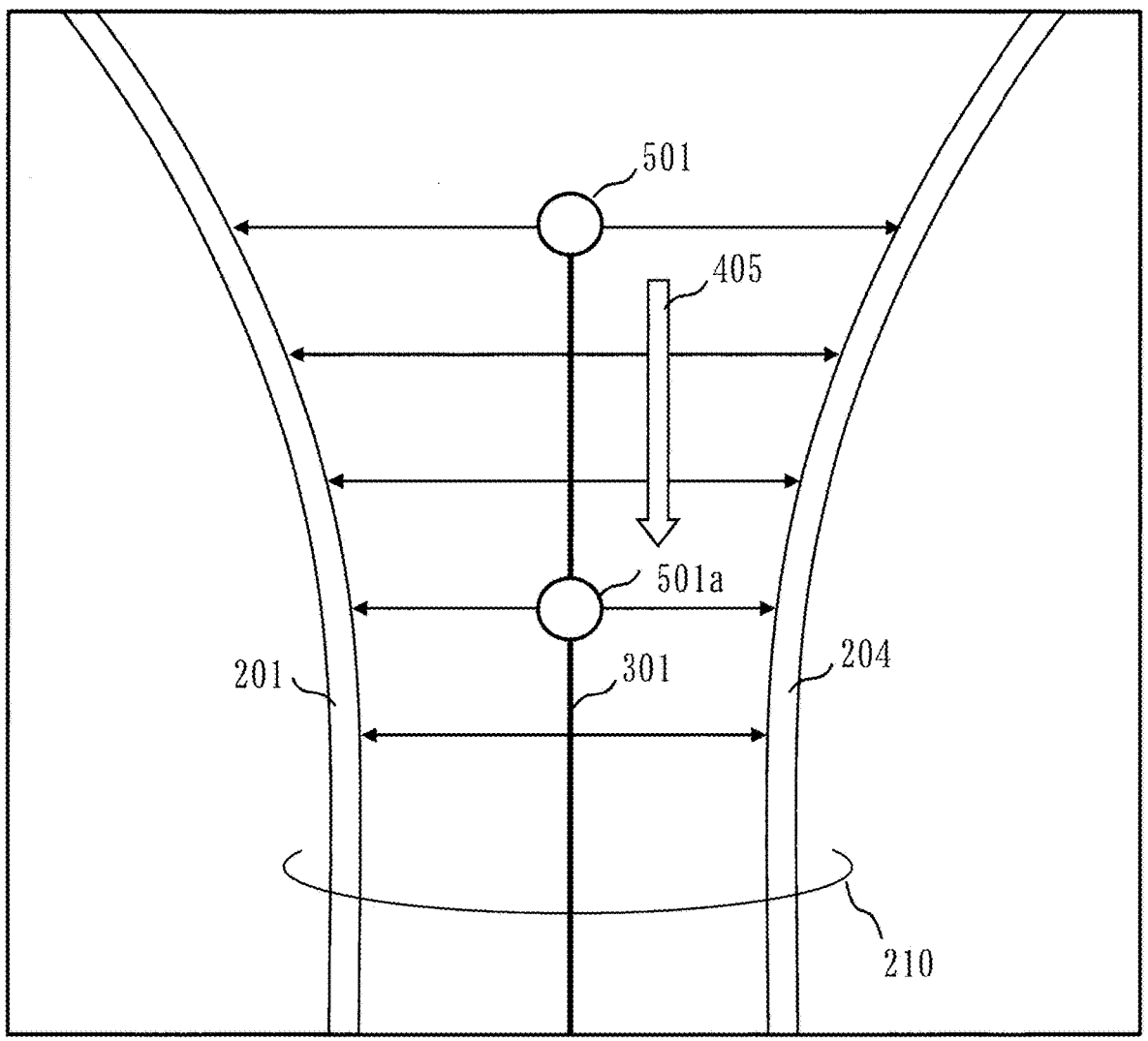
FIG. 6 is a diagram of Embodiment 1 which illustrates correction of an endpoint position by a connection unit 13.

FIG. 6 illustrates correction of an endpoint position by the connection unit 13. FIG. 6 presents part of FIG. 3. Concerning correction of the position of the endpoint 501, the connection unit 13 corrects the position of the endpoint 501 by tracing the lane link back to a portion where a lane width at the endpoint position becomes constant. In FIG. 6, the endpoint 501 is corrected to a position of an endpoint 501*a*. "A lane width becomes constant" is an example. The position of the endpoint after correction is determined based on a width of the lane 210. Specifically, the connection unit 13 checks a rate of change of the lane width at the endpoint 501 of the lane link 301 in a direction of an arrow 405. The connection unit 13 changes the endpoint position to a position where a value of the rate of change becomes equal to or less than a predetermined value. A value of the rate of change becomes equal to or less than a predetermined value when, for example, a change in lane width per 1-m distance in an advancing direction of the arrow 405 is 10 cm or less.

<Step S44>

In step S44, the connection unit 13 performs an endpoint connection process.

Figure 7:
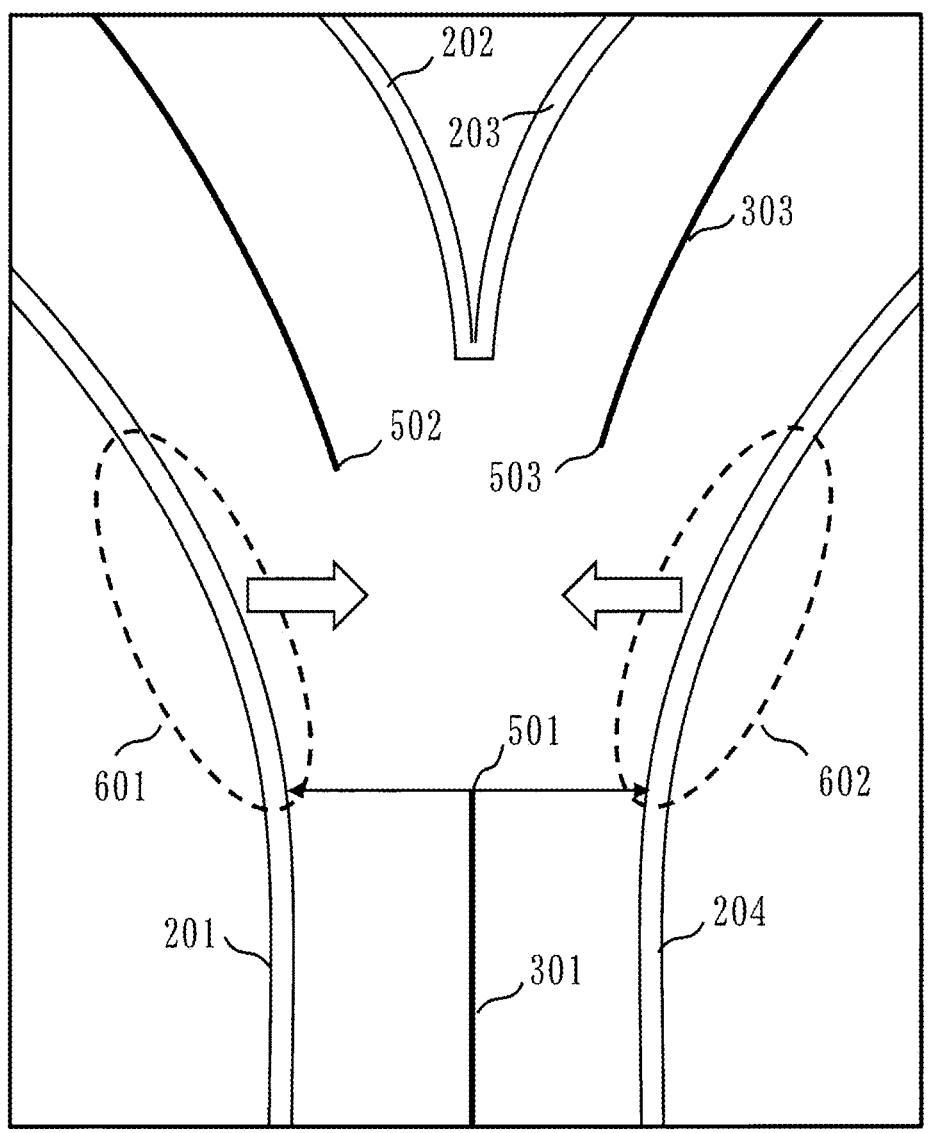
FIG. 7 is a diagram of Embodiment 1 which illustrates branching that is the same as that of FIG. 3.

FIG. 7 illustrates branching that is the same as that of FIG. 3.

Figure 8:
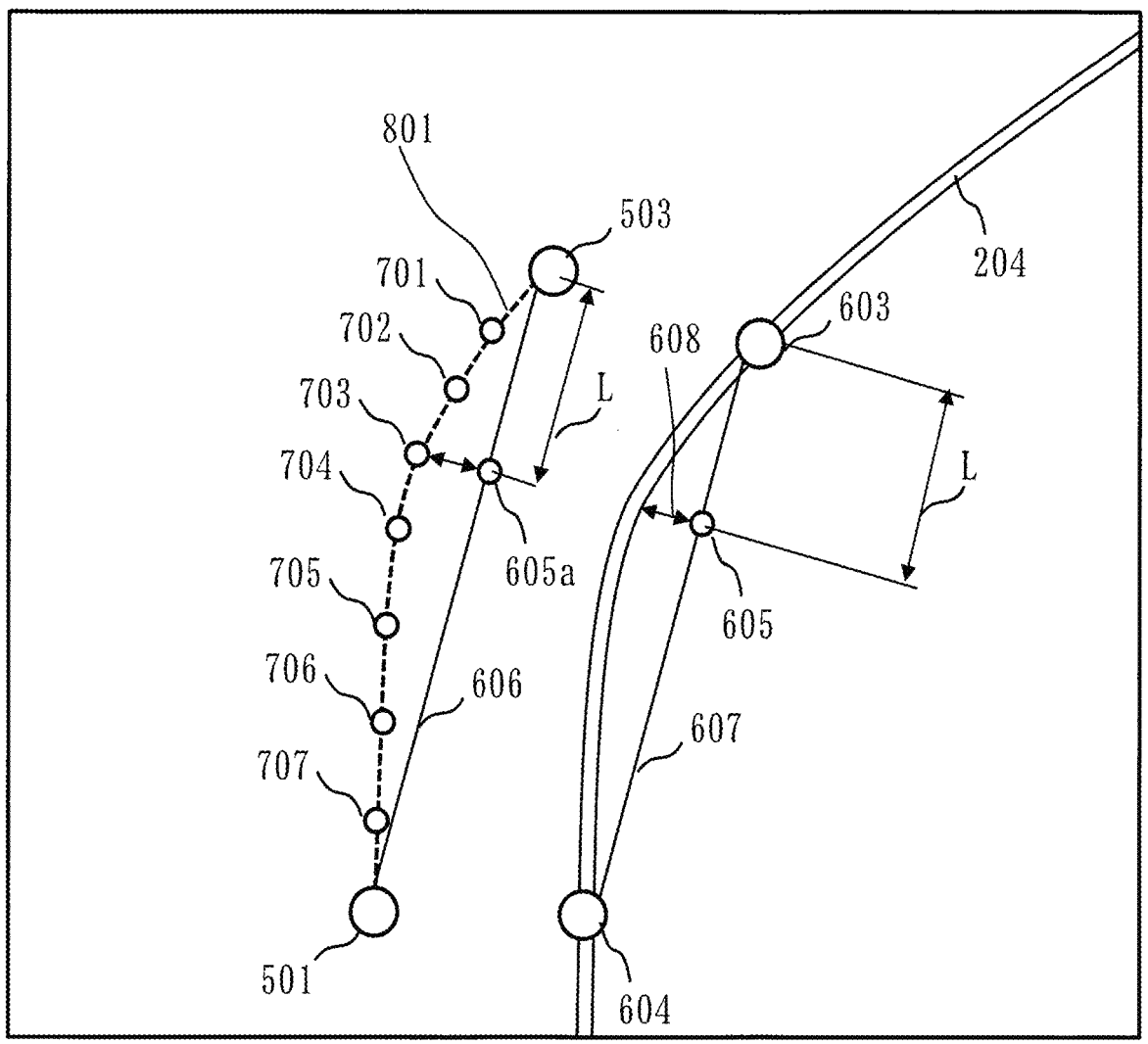
FIG. 8 is a diagram of Embodiment 1 which illustrates a shape of a lane link which connects endpoints to each other.

FIG. 8 illustrates a shape of a lane link 801 that connects endpoints to each other.

When connecting endpoints to each other, the connection unit 13 determines a shape of a lane link which is to be generated, with utilizing a shape of a road marking line shared between endpoints, as illustrated in FIG. 7. A lane link that connects the endpoint 501 and the endpoint 502 utilizes a shape of a road marking line at a portion of a broken line 601. A lane link that connects the endpoint 501 and the endpoint 503 utilizes a shape of a road marking line at a portion of a broken line 602. This will be described with referring to FIG. 8. Specifically, first, the connection unit 13 connects the endpoint 501 and the endpoint 503 with a line segment 606, and connects a point 603 and a point 604 on the road marking line 204 utilized for generating the endpoints 501 and 503, with a line segment 607. The connection unit 13 calculates a distance 608 between the road marking line 204 and a point 605 which is at a position on the line segment 607 and at a distance L from the point 603. Concerning a point 605*a* at the distance L from the endpoint 503 of the line segment 606, the connection unit 13 generates, at a position of the same distance as the distance 608 from the point 605*a*, a formation point 703 of a connection line. Other formation points 701 and 702, and 704 to 707 are formed in the same manner as the formation point 703.

The connection unit 13 connects a plurality of formation points, thereby generating the lane link 801 that connects the endpoint 503 and the endpoint 501. The connection unit 13 can also utilize a shape which is reduced or enlarged from a figure determined by the line segment 607 and by the shape of the road marking line 204 connecting the point 603 and the point 604, as the shape of the lane link 801.

Figure 9:
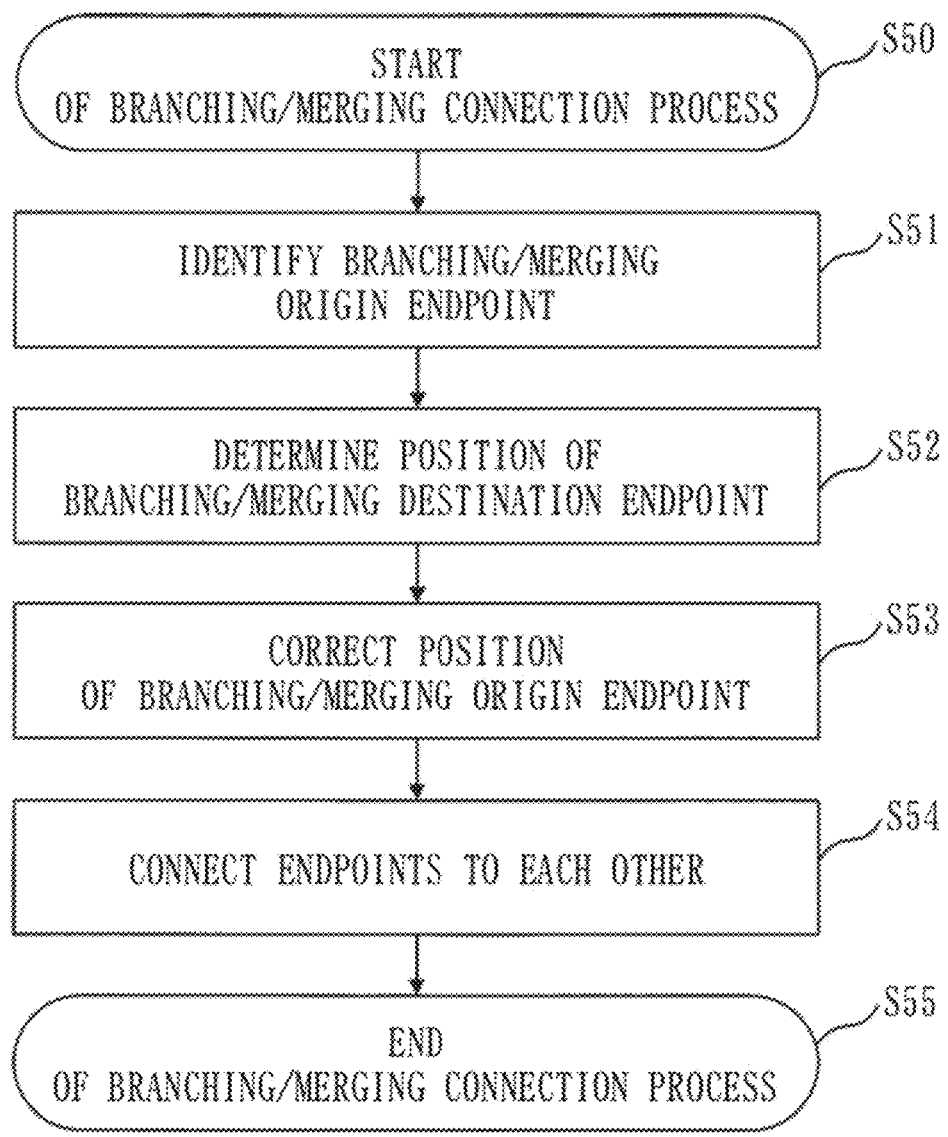
FIG. 9 is a diagram of Embodiment 1 which is a flowchart illustrating a branch/merge connection process conducted by the connection unit 13.

FIG. 9 is a flowchart illustrating a branch/merge connection process conducted by the connection unit 13. Operations of the branch/merge connection process conducted by the connection unit 13 will be described with referring to FIG. 9.

Figure 10:
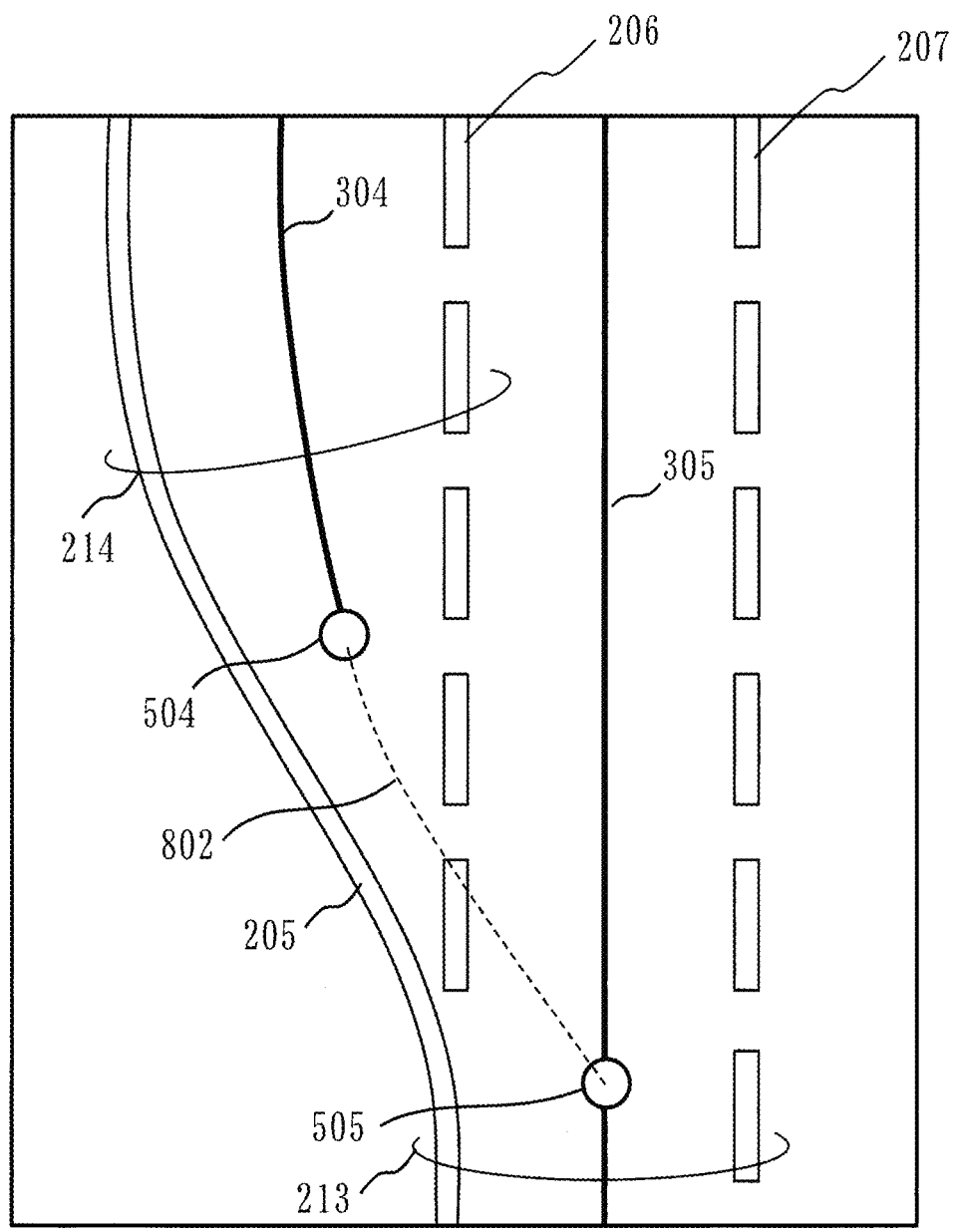
FIG. 10 is a diagram of Embodiment 1 which illustrates a situation where a lane link 802 is generated by the branch/merge connection process conducted by the connection unit 13.

FIG. 10 illustrates a situation where a lane link is generated by the branch/merge connection process of the connection unit 13. The branch/merge connection process of the connection unit 13 is targeted at generation of a lane link at a portion as illustrated in FIG. 10. FIG. 10 presents a branching/merging portion of FIG. 4. As illustrated in FIG. 10, an endpoint 504 of a lane link 304 of the lane 214 will be referred to as a branching/merging origin endpoint (origin endpoint hereinafter), and a portion to be connected to an endpoint will be referred to as a branching/merging destination endpoint (destination endpoint hereinafter).

When an endpoint exists only on one of the lane link of the first section and the lane link of the second section in an area where the lane link of the first section and the lane link of the second section are to be connected, the connection unit 13 refers to the endpoint generation rule information 103 which defines a generation rule for generating an endpoint. By referring to the endpoint generation rule information 103, the connection unit 13 generates, on the other lane on which no endpoint exists, an endpoint that should be connected to an endpoint existing only on one lane link. The endpoint generation rule information 103 is stored in the auxiliary storage device 30. The connection unit 13 can specify an area where the lane link of the first section and the lane link of the second section are to be connected, by a circle with a radius R about an origin endpoint as the center.

Figure 11:
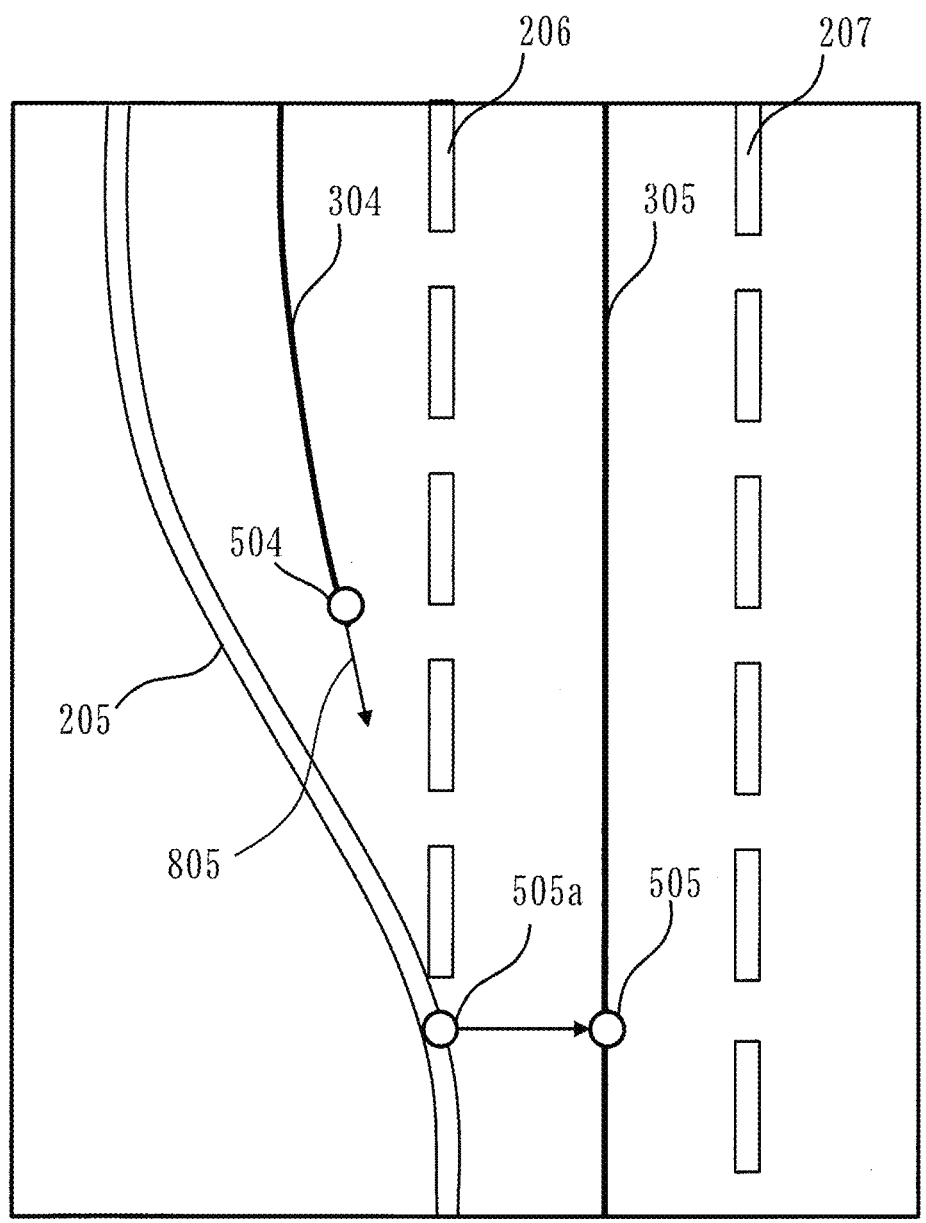
FIG. 11 is a diagram of Embodiment 1 which describes how a destination endpoint is determined by the connection unit 13.

A scheme to be described below for FIGS. 10 and 11 is an example of the generation rule defined by the endpoint generation rule information 103 for generating an endpoint. In FIGS. 10 and 11, an endpoint exists on the lane link 304 of the first section, and no endpoint exists on the lane link 305 of the second section within a range that can be seen on FIGS. 10 and 11. The lane link 304 is defined by the road marking line 205 and the road marking line 206. The lane link 305 presents a state where the lane link 305*a* and lane link 305*b* of FIG. 4 are connected in series, as described above.

<Step S51>

In the branch/merge connection process, first, the connection unit 13 extracts an origin endpoint. In step S51, the connection unit 13 acquires an endpoint position of the endpoint 504 of the lane link 304, and endpoint positions of the two road marking lines 205 and 206 based on generation of the endpoint 504. The connection unit 13 extracts, as an origin endpoint, an endpoint spaced apart by a predetermined distance or more (for example, 15 m or more) from any endpoint among all endpoints of the road marking lines 205 and 206. In FIG. 10, the connection unit 13 extracts the endpoint 504 as the origin endpoint.

<Step S52>

In step S52, the connection unit 13 determines a position of a destination endpoint.

FIG. 11 is a diagram describing how a destination endpoint is determined by the connection unit 13. The connection unit 13 specifies, on one of the road marking line 205 and the road marking line 206 which form the endpoint 504, a road marking line endpoint 505*a* which is the closest to the origin endpoint 504, in a direction 805 continuous from the endpoint 504. The connection unit 13 extracts a "point on the lane link 305" which is the closest to this road marking line endpoint 505a, as a destination endpoint 505. The road marking line endpoint 505a is an endpoint of the road marking line 206.

<Step S53>

In step S53, the connection unit 13 corrects a position of an origin endpoint. This process is the same as the process of step S43, and accordingly its description will be omitted.

<step S54>

In step S54, the connection unit 13 generates a lane link 802 by an endpoint connection process. As this process is also the same as the process of step S44, its description will be omitted. In FIG. 10, the lane link 802 is expressed by a broken line.

Effect of Embodiment 1

According to the lane link generation device 100 of Embodiment 1, since a lane link can be automatically generated from road marking line information flexibly, a load required for map generation can be reduced. Hence, a cost involved in map generation can be reduced.

Since the lane link generation device 100 generates a connection destination endpoint, a lane link can be generated even at a branching/merging portion.

Furthermore, since the lane link generation device corrects a position of an endpoint, a smooth lane link can be generated.

Embodiment 1 has been described. Of Embodiment 1, one portion may be practiced partly. Alternatively, of Embodiment 1, two or more portions may be partly combined and practiced. Note that the present invention is not limited to Embodiment 1, and various changes can be made as necessary.

Embodiment 2

The hardware configuration of the lane link generation device 100 of Embodiment 1 will be supplemented by Embodiment 2. The function of the lane link generation device 100 described in Embodiment 1 is implemented by a program. Alternatively, the function of the lane link generation device 100 may be implemented by hardware.

Figure 12:
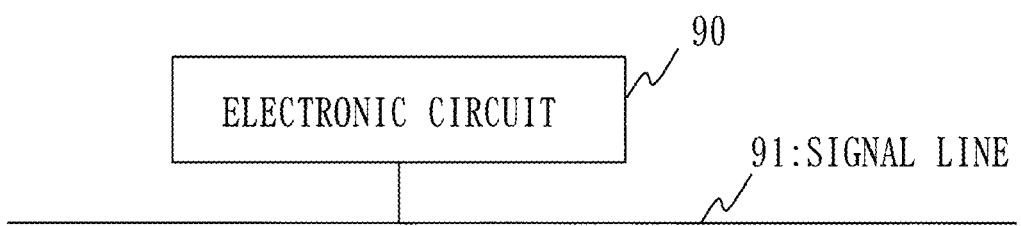
FIG. 12 is a diagram of Embodiment 2 which supplements the hardware configuration of the lane link generation device 100.

FIG. 12 illustrates a configuration in which the function of the lane link generation device 100 is implemented by hardware. An electronic circuit 90 of FIG. 12 is a dedicated electronic circuit that implements the functions of the acquisition unit 11, lane link generation unit 12, connection unit 13, and communication processing unit 14 of the lane link generation device 100. The electronic circuit 90 is connected to a signal line 91. The electronic circuit 90 is specifically a single circuit, a composite circuit, a programmed processor, a parallel-programmed processor, a logic IC, a GA, an ASIC, or an FPGA. Note that GA stands for Gate Array, ASIC for Application Specific Integrated Circuit, and FPGA for Field-Programmable Gate Array.

The functions of the constituent elements that make up the function of the lane link generation device 100 may be implemented by one electronic circuit, or may be implemented by a plurality of electronic circuits through dispersion. The functions of some of the constituent elements that make up the function of the lane link generation device 100 may be implemented by the electronic circuit 90, and the remaining functions may be implemented by software.

The CPU and the electronic circuit 90 are each called processing circuitry as well. The functions of the acquisition unit 11, lane link generation unit 12, connection unit 13, and communication processing unit 14 of the lane link generation device 100 may be implemented by processing circuitry.

REFERENCE SIGNS LIST

10: processor; 11: acquisition unit; 12: lane link generation unit; 13: connection unit; 14: communication processing unit; 20: main storage device; 30: auxiliary storage device; 40: input interface; 50: output interface; 60: communication interface; 41: input device; 51: display device; 61: communication device; 71, 72, 73, 74, 75, 76: arrow; 81, 82, 83, 84, 85: arrow; 100: lane link generation device; 101: lane link generation program; 102: determination rule information; 103: endpoint generation rule information; 104: lane link generation rule information; 200: road marking line information; 201, 202, 203, 204, 205, 206, 207: road marking line; 206a: broken line; 207a: broken line; 210, 211, 212, 213, 214: lane; 301, 302, 303, 304, 305: lane link; 401, 402: broken-line arrow; 403, 404: solid-line arrow; 501, 502, 503, 504: endpoint; 505: destination endpoint; 505a: road marking line endpoint; 601, 602: broken line; 603, 604, 605, 605a: point; 606, 607: line segment; 608: distance.

The invention claimed is:

1. A lane link generation device comprising:
processing circuitry
to acquire information of a first section representing a vehicle traveling area and information of a second section representing a vehicle traveling area;
to generate a lane link of the first section, which represents a reference line of the traveling area, based on two boundary lines of the traveling area represented by the first section, and to generate a lane link of the second section, which represents a reference line of the traveling area, based on two boundary lines of the traveling area represented by the second section, the lane link of the first section to be arranged only where spacing between the two boundary lines of the traveling area represented by the second section fall within a predetermined value range, and the lane link of the second section to be arranged only where spacing between the two boundary lines of the traveling area represented by the second section fall within the predetermined value range; and
to connect the lane link of the first section with the lane link of the second section, when at least one of the two boundary lines of the traveling area represented by the first section is common to at least one of the two boundary lines of the traveling area represented by the second section.

2. The lane link generation device according to claim 1, wherein the processing circuitry is configured to generate the lane link of the first section where spacing between the two boundary lines of the traveling area represented by the first section fall within a predetermined value range.

3. The lane link generation device according to claim 1, wherein the processing circuitry is configured to connect the lane link of the first section with the lane link of the second section by generating a connecting link that connects the lane link of the first section with the lane link of the second section, the processing circuitry calculates a shape of the connecting link based on a shape of the at least one of the two boundary lines that is common to the two boundary lines of the traveling area represented by the second section.

4. A non-transitory computer readable medium storing a lane link generation program which causes a computer to execute:

a process of acquiring information of a first section representing a vehicle traveling area and information of a second section representing a vehicle traveling area;

a process of generating a lane link of the first section, which represents a reference line of the traveling area, based on two boundary lines of the traveling area represented by the first section, and generating a lane link of the second section, which represents a reference line of the traveling area, based on two boundary lines of the traveling area represented by the second section, the processes of generating the lane link of the first section to be arranged only where spacing between the two boundary lines of the traveling area represented by the second section fall within a predetermined value range, and the process of generating the lane link of the second section to be arranged only where spacing between the two boundary lines of the traveling area represented by the second section fall within the predetermined value range; and a process of connecting the lane link of the first section with the lane link of the second section, when at least one of the two boundary lines of the traveling area represented by the first section is common to at least one of the two boundary lines of the traveling area represented by the second section.

5. The non-transitory computer readable medium of claim 4, wherein the lane link generation program further causes the computer to execute:

a process of connecting the lane link of the first section with the lane link of the second section by generating a connecting link that connects the lane link of the first section with the lane link of the second section; and a process of calculating a shape of the connecting link based on a shape of the at least one of the two boundary lines that is common to the two boundary lines of the traveling area represented by the second section.

* * * * *